US009459683B2

(12) United States Patent
Puthiyedath et al.

(10) Patent No.: US 9,459,683 B2
(45) Date of Patent: Oct. 4, 2016

(54) TECHNIQUES FOR ENTERING A LOW POWER STATE

(71) Applicant: Intel Corporation, Santa Clara, CA (US)

(72) Inventors: Leena K. Puthiyedath, Beaverton, OR (US); Anil Aggarwal, Portland, OR (US); Qingda Lu, Portland, OR (US); Rahul Seth, Hillsboro, OR (US); Michael C. Walz, Vancouver, WA (US)

(73) Assignee: INTEL CORPORATION, Santa Clara, CA (US)

( * ) Notice: Subject to any disclaimer, the term of this patent is extended or adjusted under 35 U.S.C. 154(b) by 252 days.

(21) Appl. No.: 14/040,118

(22) Filed: Sep. 27, 2013

(65) Prior Publication Data
US 2015/0095676 A1    Apr. 2, 2015

(51) Int. Cl.
    G06F 1/32    (2006.01)
(52) U.S. Cl.
    CPC ........... G06F 1/3234 (2013.01); G06F 1/3206 (2013.01); G06F 1/3228 (2013.01); G06F 1/3215 (2013.01); *Y02B 60/32* (2013.01)
(58) Field of Classification Search
    CPC .................................................... G06F 1/3234
    USPC ......................................................... 713/323
    See application file for complete search history.

(56) References Cited

U.S. PATENT DOCUMENTS

| | | | | |
|---|---|---|---|---|
| 2003/0061526 A1* | 3/2003 | Hashimoto | ........... | G06F 1/3228 713/320 |
| 2003/0145242 A1* | 7/2003 | Derocher | .............. | G06F 1/3203 713/320 |
| 2003/0196127 A1* | 10/2003 | Olsen | ............................ | 713/300 |
| 2005/0076254 A1* | 4/2005 | Robinson | .............. | G06F 1/3209 713/320 |
| 2005/0239518 A1* | 10/2005 | D'Agostino | .......... | G06F 1/3203 455/574 |
| 2008/0034242 A1* | 2/2008 | Ishikura et al. | .............. | 713/323 |
| 2008/0180564 A1* | 7/2008 | Yamaji | ............... | H04N 5/23241 348/372 |
| 2009/0235105 A1* | 9/2009 | Branover et al. | ............. | 713/330 |
| 2009/0259863 A1* | 10/2009 | Williams et al. | ............. | 713/323 |
| 2010/0058078 A1* | 3/2010 | Branover et al. | ............. | 713/300 |
| 2010/0083387 A1* | 4/2010 | Rodgers | .................. | G06F 21/81 726/36 |
| 2011/0164484 A1* | 7/2011 | Jin | ............................. | 369/47.14 |
| 2011/0179298 A1* | 7/2011 | Odaohhara | ............... | G06F 1/26 713/323 |
| 2011/0208986 A1* | 8/2011 | Soga | ............................. | 713/323 |
| 2011/0291748 A1* | 12/2011 | Li et al. | ........................ | 327/544 |
| 2012/0144220 A1* | 6/2012 | Mearns | ................. | G06F 1/3228 713/323 |
| 2012/0246502 A1* | 9/2012 | Koga | ................. | H04N 1/00896 713/323 |
| 2013/0205155 A1* | 8/2013 | Yang | ..................... | G06F 1/3234 713/323 |
| 2014/0189401 A1* | 7/2014 | Keppel et al. | ................ | 713/323 |
| 2014/0313536 A1* | 10/2014 | Takeuchi | .............. | G06F 1/3296 358/1.14 |

* cited by examiner

*Primary Examiner* — Thomas Lee
*Assistant Examiner* — Volvick Derose

(57) ABSTRACT

Various embodiments are generally directed to an apparatus, method and other techniques for initiating a transition into a lower power state, determining that a device process prevents a platform processing device from completing the transition to the lower power state and interrupting a processing component from an intermediate power state in order to process the process prior to execution of a defined event.

22 Claims, 9 Drawing Sheets

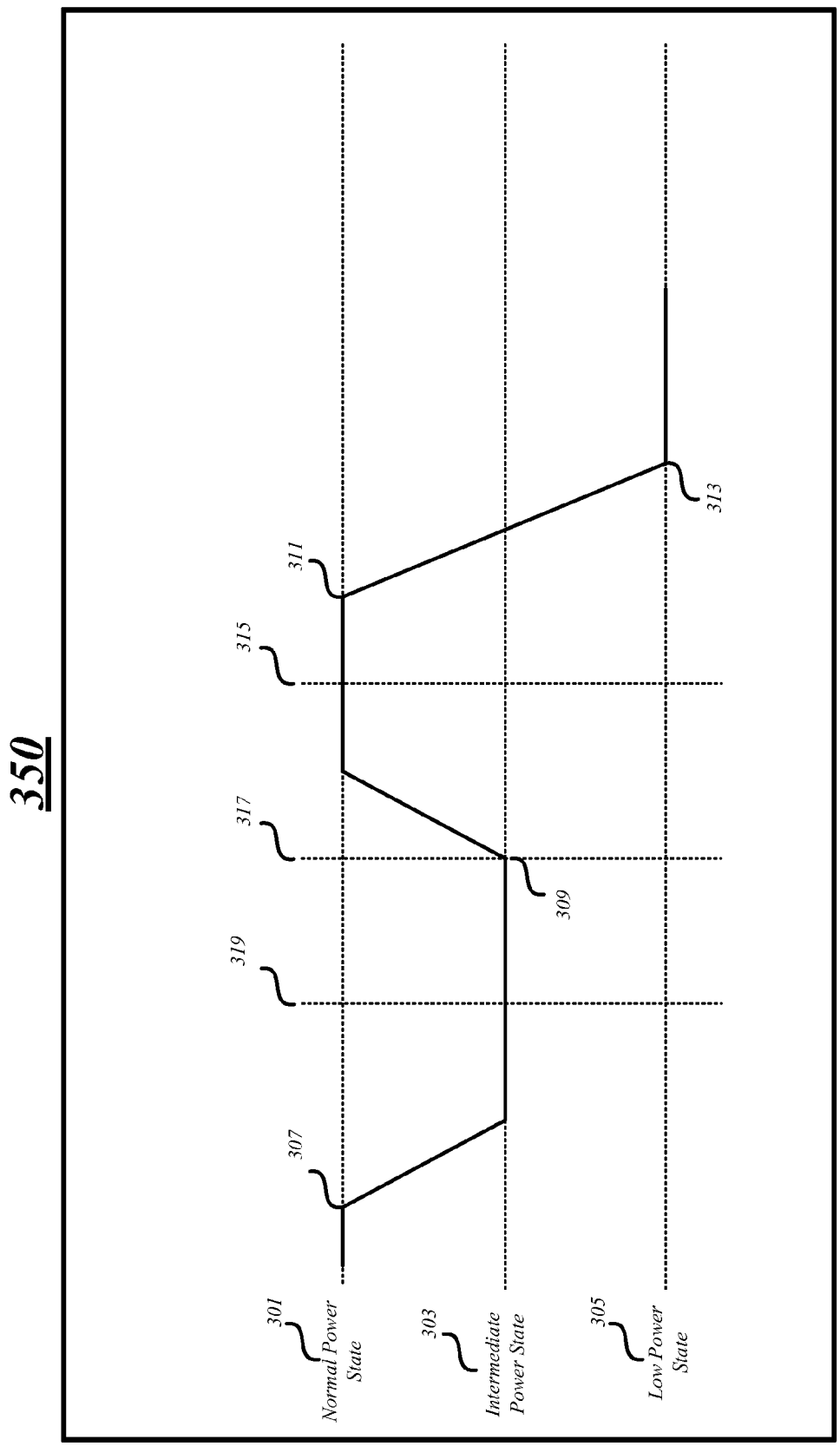

TECHNIQUES FOR ENTERING A LOW POWER STATE

TECHNICAL FIELD

Embodiments described herein generally relate to low power states for computing devices. In particular, embodiments relate to transition from a normal power state to a low power state for a computing device and components.

BACKGROUND

Mobile devices are continuing to increase in popularity and the processing capabilities of these devices also continue to increase. Accordingly, more and more tasks are being performed on mobile devices. In order to ensure the continued proliferation of mobile devices, extending the life of the batteries used to power the mobile devices is a necessity. Existing computer platforms variously include one or more features for managing the distribution of power to, or use of power by, components of such platforms. Such features may implement various power states, for example, in response to a user-initiated platform suspend or hibernate request. The mobile device may then transition to a power state based on the request. However, the transition period may take a significant amount of time, reducing the advantages of saving power by not permitting the mobile device and platform processing devices to enter a low power state in a timely fashion.

BRIEF DESCRIPTION OF THE DRAWINGS

FIG. 3C illustrates an embodiment of a third activity level diagram.

DETAILED DESCRIPTION

Figure 1:
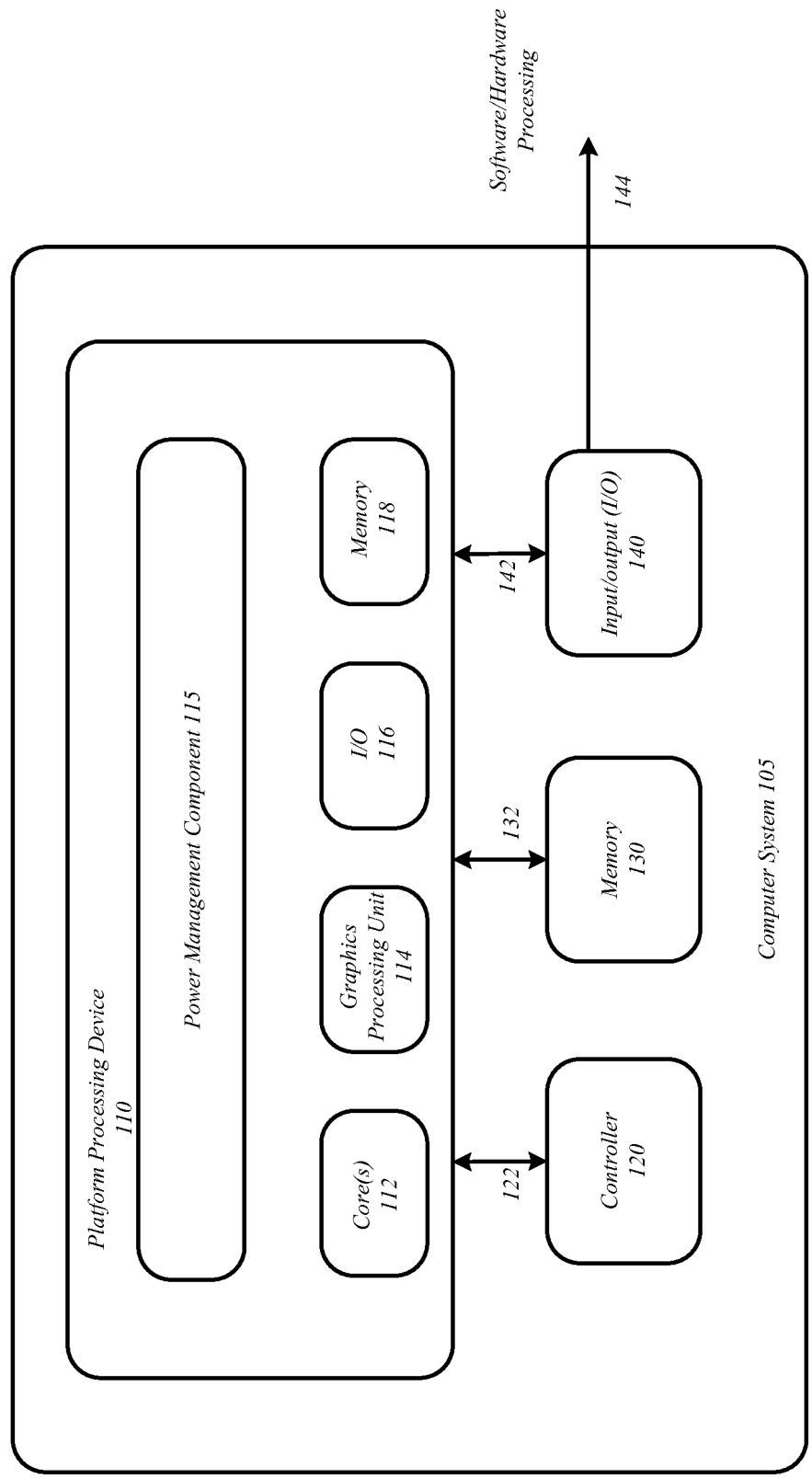
FIG. 1 illustrates an embodiment of a first system.

Various embodiments are generally directed to an apparatus, method and other techniques for transitioning a computing system and platform processing device into a low power state to increase battery life and reduce power consumption for the computing system. In some embodiments, software such as an operating system may send information to a platform processing device and a power management component may indicate that the computing system may enter the low power state.

The power management component may initiate a transition into the low power state by transitioning hardware autonomous processes and software processes into the low power state. In some embodiments, the platform processing device may not enter the low power state until these hardware autonomous processes and software processes have completed processing. The platform processing device and components may enter an intermediate state to wait for the hardware autonomous processes and software processes to complete.

In some embodiments, the platform processing device may remain in the intermediate power state until all of the processes have completed processing or until a defined event occurs, such as a predefined interrupt or an expiration of a scheduled timer. However, waiting for the processes to complete or until the defined event occurs may take a significant amount of time such as seconds or minutes and any significant battery life gain may be lost by not entering into the low power state in a timely manner.

The power management component may reduce the amount of time needed to transition into the low power state by interrupting one or more processor components prior to a defined event to enable the one or more processor components to process one or more software processes. In some embodiments, the power management component may wait for a platform specific time period to allow for autonomous hardware processes to complete and determine if the platform processing device has entered the low power state. In some embodiments, the platform processing device may not enter the low power state after the expiration of the platform specific time period because autonomous hardware processes and/or software processes have not finished processing. The power management component may then interrupt the one or more processor components to process the software processes. By waiting a platform specific time period to determine if the platform processing device has entered the low power state, the power management component allows for autonomous hardware processes to complete and eliminates the need to hardcode platform specific power dependencies into an operating system.

In some embodiments, the power management component may receive software ready times from one or more software processes indicating when a software process will be ready to be processed. For example, a software process may be required to wait until the expiration of a timer before being processed. In these embodiments, the power management component may wait the longer of the platform specific time period and the shortest of the software ready time periods before determining if the platform processing device has transitioned into the low power state and/or interrupting or waking the power component to process software processes. By waking the processor component to process the software processes, a significant reduction in the amount of time to transition into the low power state may be realized. In addition, by waiting until the longer of the platform specific time period and the software ready time period, the power management component may avoid waking the processor component too soon and before software processes may be ready to be processed.

With general reference to notations and nomenclature used herein, the detailed description that follows may be presented in terms of program procedures executed on a computer or network of computers. These procedural descriptions and representations are used by those skilled in the art to most effectively convey the substance of their work to others skilled in the art.

A procedure is here and is generally conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein that form part of one or more embodiments. Rather, the operations are machine operations. Useful machines for performing operations of various embodiments include general-purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates an embodiment of an exemplary computer system 105 suitable for implementing various embodiments described herein. In various embodiments, the computer system 105 comprises a platform processing device 110, a controller 120, a memory device 130 and an input/output (I/O) device 140. The platform processing device 110 may be any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The platform processing device 110 may be connected to and communicate with the controller 120, the memory device 130, and the I/O device 140 via interconnects 122, 132 and 142, respectively. Moreover, the controller 120, the memory device 130, and the I/O device 140 may communicate with all of the components of the platform processing device 110.

While not limited in this respect, the platform processing device 110 may comprise a power management component 115, one or more processor components 112, a graphics processing unit 114, a platform I/O device 116, a platform memory device 118 and any other uncore (non-core) components (not shown). Uncore components may include other memory, caches, pipelines, I/O devices and controllers. In some embodiments, the platform processing device 110 may have more than two processing cores, for example. The one or more processor components 112 may have more than one processing unit or processing cores. The one or more processor components 112 include, but are not limited to, pre-fetch logic to fetch instructions, decode logic to decode the instructions, execution logic to execute instructions and the like.

In some embodiments, the platform processing device 110 includes a graphics processing unit 114. The graphics processing unit 114 may function as an adjunct processor that manages graphics and/or video operations and/or processing.

The platform processing device 110 includes a platform I/O device 116 and platform memory device 118 in some embodiments. The platform I/O device 116 provides an external interface for the platform processing device 110 to other devices within computer system 105. In addition, the platform memory device 118 stores instructions and/or data of the platform processing device 110, and in particular, the one or more processor components 112. The platform memory device 118 may also store temporary variables or other intermediate information while the platform processing device 110 and the one or more processor components 112 are executing instructions. In another embodiment, the platform memory device 118 includes, but is not limited to, level one (L1), level two (L2) and level three (L3) cache memory or any other configuration of the cache memory within the platform processing device 110. The processor components 112, the graphics processing unit 114, the platform I/O device 116 and platform memory device 118 may communicate with each other via interconnects (not shown).

The power management component 115 may be operative to manage power states of the computing system 105, and in particular, the platform processing device 110 and components. In some embodiments, the power management component 115 may be operative to initiate a transition for the platform processing device 110 to enter a low power state. The low power state can be any Advanced Configuration and Power Interface (ACPI) state as defined in the Advanced Configuration and Power Interface Specification, Revision 5.0, published on Dec. 6, 2011, or later or earlier publication. In some embodiments, the low power state may be an idle state such as S0ix.

In some embodiments, the power management component 115 may receive information or an instruction from software, such as an operating system or any other program, indicating that the platform processing device 110 may enter a low power state. In one example, an operating system may indicate to the platform processing device 110 and power management component 115 that it may enter the low power state by initiating entry into an intermediate power state such as Mwait C state corresponding to the ACPI C3 state. The ACPI C3 state is generally known as the sleep state and offers improved power savings over the C1 and C2 states. While in the C3 state, all internal clock signals from the processing cores are cut. However, the one or more processing cores caches are maintained. The operating system is responsible for ensuring that the caches maintain coherency.

The platform processing device 110 may enter the low power state once all of the hardware autonomous component processes and software processes complete processing. A hardware autonomous component process may be a process performed by a hardware component of the platform processing device such as registers, memory, cache, transistors, clocks, processing cores, controllers, I/O components, etc. that does not require software to process information. A software process may be any process stored in memory or cache that requires processing by a hardware component. In some embodiments, the hardware autonomous component processes and software processes may be processes generated to transition the hardware components and software processes into the low power state.

In some embodiments these hardware autonomous processes and software processes may not immediately complete processing and may hold up the platform processing device 110 from transitioning into the target low power state. In some cases, the platform device 110 may be in the intermediate power state where the maximum efficiency of the low power state is not realized. The platform processing device 110 may stay in this intermediate power state until all of the hardware autonomous components processes and software processes finish processing. In some embodiments, the processing may not finish until a defined event such as a predefined interrupt or an expiration of a scheduled timer occurs waking the platform processing device 110 and components from the intermediate state and processing one or more of the software processes. The predefined interrupt may be any interrupt that was scheduled by hardware or software prior to the initiation into the low power state. The scheduled timer may be any hardware or software timer or clock scheduled to generate an interrupt or initiate processing by the cores upon expiration of the timer.

In some embodiments, the power management component 115 may determine when autonomous hardware component processing, software processing, or both are preventing the platform processing device 110 from entering the low power state. The power management component 115 may make the determination based on whether the platform processing device 110 has entered or not entered the low power state after the expiration of a predefined time period has expired. The predefined time period may be any time period such as the average time it takes the platform processing device 110 to enter the low power state. The power management component may also monitor autonomous components and software processes to determine if additional processing is required by these components and processes. In addition, the power management component 115 may determine if the platform processing device 110 is in a low power state by signals received from processor components 112 indicating the platform processing device 110 is in the low power state.

If the power management component 115 determines that one or more autonomous hardware components or software processes are preventing the platform processing device 110 from entering the low power state, the power management component 115 waits a time period such as a platform specific time period or a software ready time period and then makes another determination as to whether the platform processing component 110 component is in the low power state. In some embodiments, the power management component 115 may wait the longer of the platform specific time period and the software ready time period before making the determination.

The platform specific time period may be a predefined time set by the platform processing device 110 to allow autonomous hardware components to finish processing information. In some embodiments, one or more autonomous hardware components may send time information indicating an amount of time required to finish processing to the power management component 115. In this example, the platform time period may be the longest time received by the power management component 115.

The software ready time period is a time period indicating when a next software event is ready to be processed. In various embodiments, one or more software processes may send software ready time information to the power management component 115 and the software ready time period may be shortest of the software ready time periods received by the power management component 115.

In various embodiments, when the power management component 115 determines that the platform processing device has not entered the low power state after the longer of the platform specific time period and the software ready time period, the power management component 115 may generate an interrupt or a wake event to wake a processing component such as processor components 112 from the Mwait or C3 state, i.e., intermediate power state, to process one or more software processes. The interrupt or wake event may be generated prior to the defined event. By generating an unscheduled interrupt or wake event to process the software processes, the platform processing device 110 may enter the low power state in a significantly shorter amount of time.

In some embodiments, the platform processing device 110 and power management component 115 may receive another indication that the platform processing device 110 is ready to enter the low power state after the completion of processing the software processes. The platform processing device 110 may then enter the low power state. However, in some embodiments, additional autonomous hardware components and software processes may require processing before the platform processing device 110 can enter the low power state. For example, additional processes may have been dependent on other processes finishing before they may be processed. The power management component 115 may complete the same process as described above and in more detail in FIG. 2 to process all of the autonomous hardware component processing and software processing. This process may be repeated a number of iterations before all of the autonomous hardware component processing and software processing is complete.

Computing device 105 may also comprise controller 120 which may include a microcontroller or other type of processing circuitry, memory and interface logic. In some embodiments, the controller 120 may monitor and control operation of the computer system 105 including, but not limited, monitoring and controlling operation of the memory device 130 and the I/O device 140. The controller 120 may also monitor and control various aspects of the platform processing device 110, including but not limited to, communication between various components of the computer system 105 and the platform processing device 110. In various embodiments, the controller may be coupled with the platform processing device 110 via interconnect 122.

The memory device 130 stores instructions and/or data of the computer system 105. The memory device 130 may also store temporary variables or other intermediate information while the computer system 105 is executing instructions. The I/O device 140 is the interface between the computer system 105 and an external system or device. The I/O device 140 may communicate with the external system or device via a connection 144. Connection 144 may be wired or wireless or any other means known to one skilled in the art. In one embodiment, the I/O device 140 may communicate with the platform processing device 110 via interconnect 142 through the platform I/O device 116. The power management component 115, the memory device 130 and the I/O device 140 may also communicate with each other via interconnects (not shown).

The components illustrated in the computer system 105 are not meant to be limiting and are presented for purposes of illustration. In other embodiments, the configuration of the computer system 105 includes other (more or less) components than shown in FIG. 1. One of ordinary skill in the relevant art will appreciate that other configurations of the computer system 105 can be used without affecting the workings of the embodiments described herein.

Figure 2:
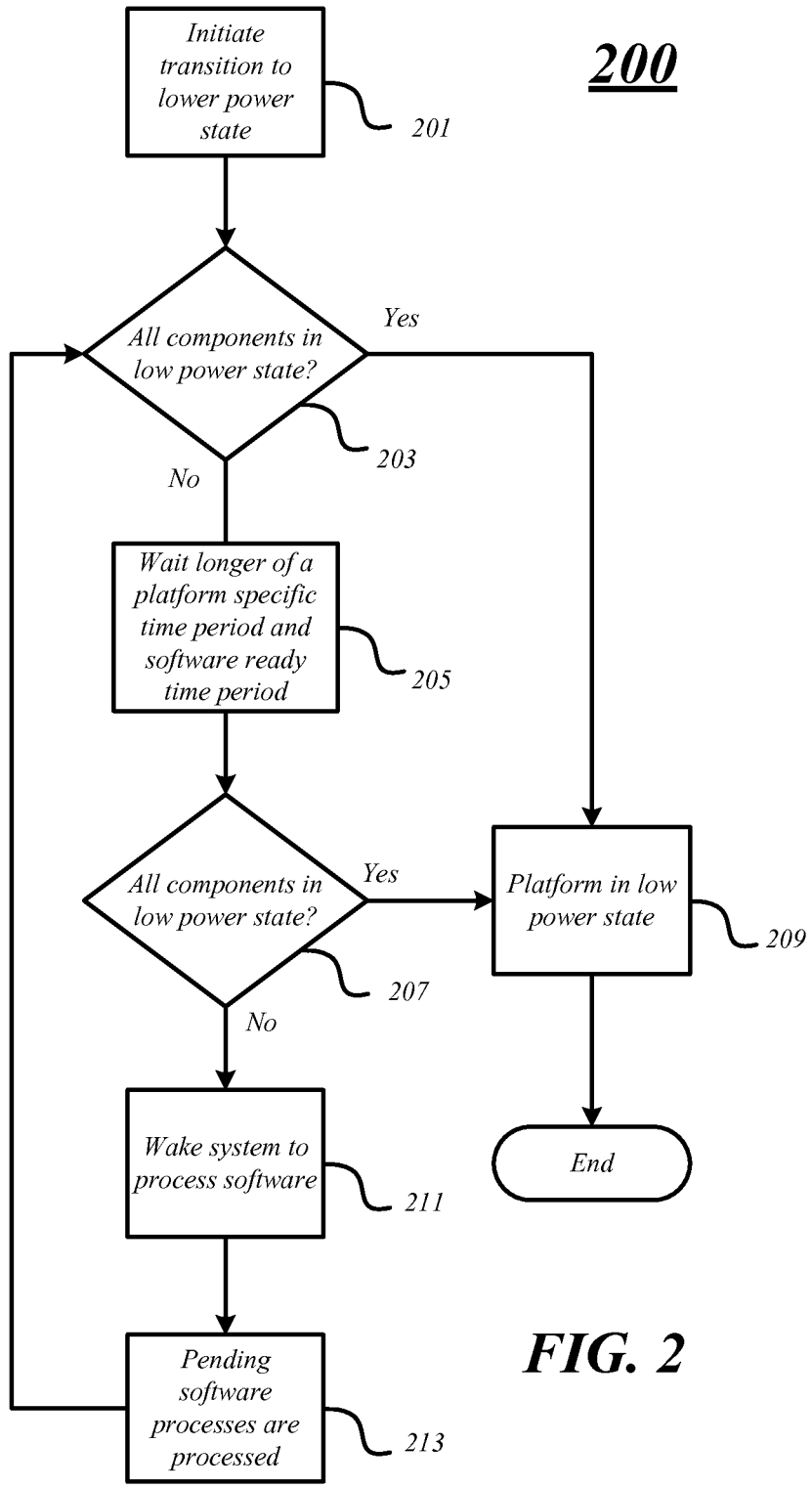
FIG. 2 illustrates an embodiment of a first logic flow.

FIG. 2 comprises a logic flow diagram illustrating one example of a platform processing device entering a low power state. For clarity purposes, the logic flow is discussed with reference to the computer system 105 of FIG. 1. At block 201, a transition to a low power state may be initiated. For example, the power management component 115 may receive information or an instruction from software, such as an operating system or any other program, indicating that the platform processing device 110 may enter a low power state. In one example, an operating system may indicate to the platform processing device 110 and power management component 115 that it may enter the low power state by putting the platform processing device 110 and/or processor components 112 into an intermediate power state such Mwait C state corresponding to the ACPI C3 state.

At decision block 203, a determination may be made as to whether all of the components of the platform processing device 110 are in a low power state. For example, the power management component 115 may determine if all of the components are in low power state after a predefined time period has expired. In another example, the power management component 115 may monitor the components, component processes and software processes to determine if the platform processing device 110 is in the low power state. In third example, the power management component 115 may determine if the platform processing device 110 is in a low power state by checking voltages applied to processor components 112 and other platform processing device 110 components and the hardware context of the memory.

If at block 203 the platform processing device 110 is determined to be in the target low power state, platform processing device 110 may stay in this state until an event or interrupt wakes the platform processing device 110 out of the state. However, if at block 203 the platform processing device 110 is determined not to be in the target low power state, the power management component 115 may wait for autonomous hardware components processing and/or software processing to complete at block 205.

In various embodiments, the power management component 115 may wait the longer of a platform specific time period and software ready time period to allow for autonomous hardware components processing to complete. In some embodiments, the power management component 115 may not receive software ready time information from the software processes, as discussed above, and may only wait for the platform specific time period before making another determination as to whether the platform processing device 110 has entered the low power state at decision block 207.

If at decision block 207, the power management component 115 determines that the platform processing device 115 is in the low power state, the logic flow may end at block 209. However, if at decision block 207 the power management component 115 determines that the platform processing device 110 is not in the low power state, the power management component 115 may generate an interrupt or a wake event to wake a processing component such as processor components 112 from the Mwait or C3 state, i.e., intermediate power state, to process one or more software processes. The interrupt or wake event may be generated prior to the defined event. By generating an unscheduled interrupt or wake event to process the software processes, the platform processing device 110 may enter the low power state in a significantly shorter amount of time. At block 213, the one or more processor components 112 may process software processes and logic flow 200 may be repeated. For example, autonomous processes and other software processes may be dependent on software processes to complete before they may be processed. In various embodiments, logic flow 200 may be repeated a number of iterations before the platform processing device 110 and components are in the low power state.

Figure 3A:
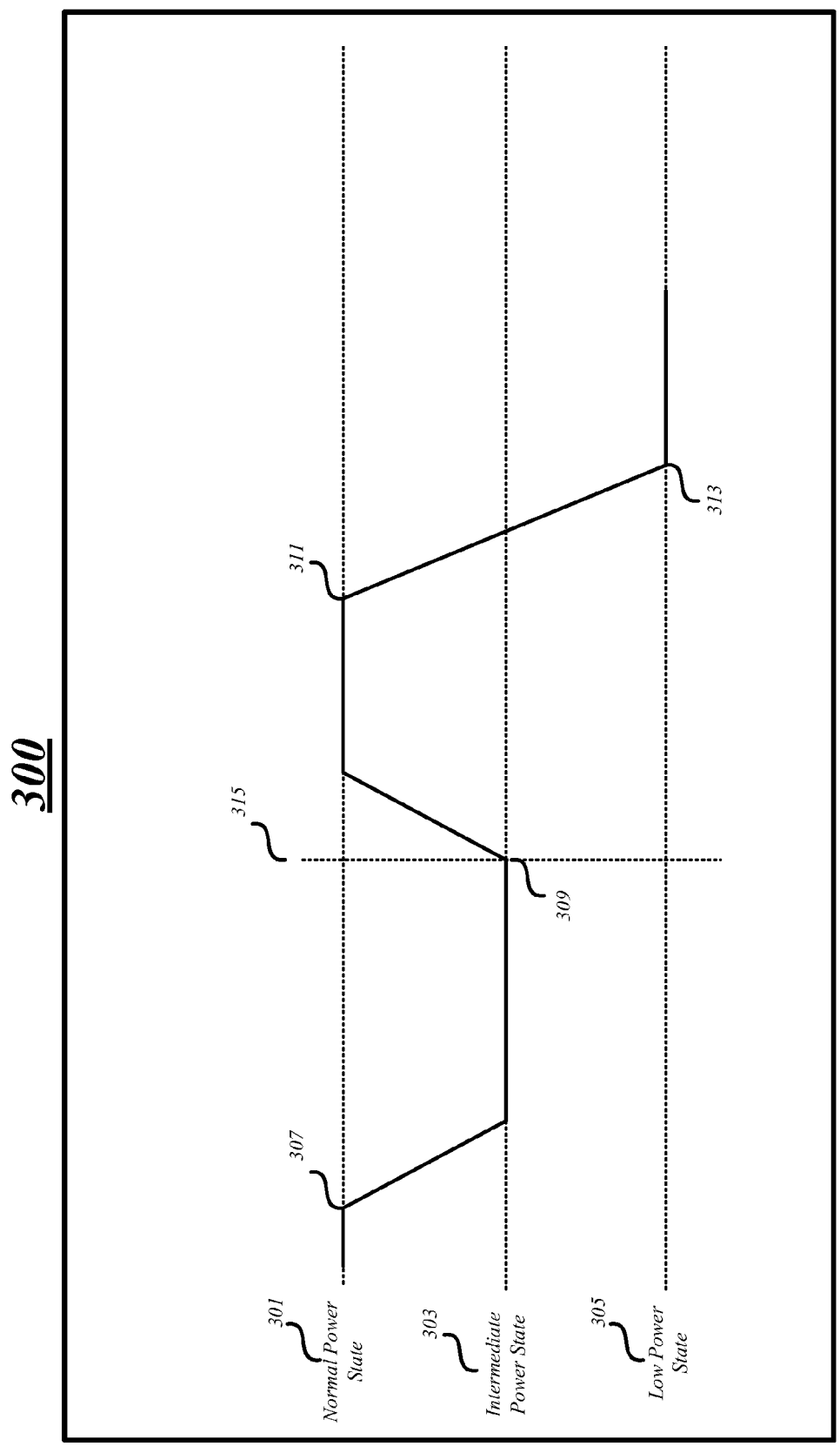
FIG. 3A illustrates an embodiment of a first activity level diagram.

FIG. 3A illustrates an exemplary embodiment of a first activity level diagram 300 for transitioning a platform processing device into a low power state. The first activity level diagram 300 illustrates a normal power state level 301, an intermediate power state level 303 and a low power state level 305. The normal power state is when the platform processing device 110 and components are fully powered on and processing information. The intermediate power state may be the Mwait state and/or ACPI C3 state where the processor components 112 are not processing but other autonomous components and software processes have not transitioned into a low power state. The low power state level 305 may be when the platform processing device 110 and components are in an idle state such as SOix.

Activity level diagram 300, at point 307 illustrates the power management component 115 receiving an indication that the platform processing device 110 may enter a lower power state. In one example, an operating system may indicate to the platform processing device 110 and power management component 115 that it may enter the low power state by putting the platform processing device 110 and/or processor components 112 into an intermediate power state such Mwait C state corresponding to the ACPI C3 state, as shown in activity level diagram 300.

At point 309 of activity level diagram 300, the platform processing device may transition back into the normal power state based on a defined event indicated by line 315. Once in the normal power state, the platform processing device 115 and cores may process any software processes preventing the platform processing device 115 from enter the low power state. Once the software processes have been processed, another indication to transition into a lower power state may be received by the platform processing device 110 and power management component 115 and transition into the low power state may begin at point 311. Further, the platform processing device 110 may enter the low power state at point 313 and remain in that state until an event or interrupt wakes the platform processing device 110 out of the low power state.

Figure 3B:
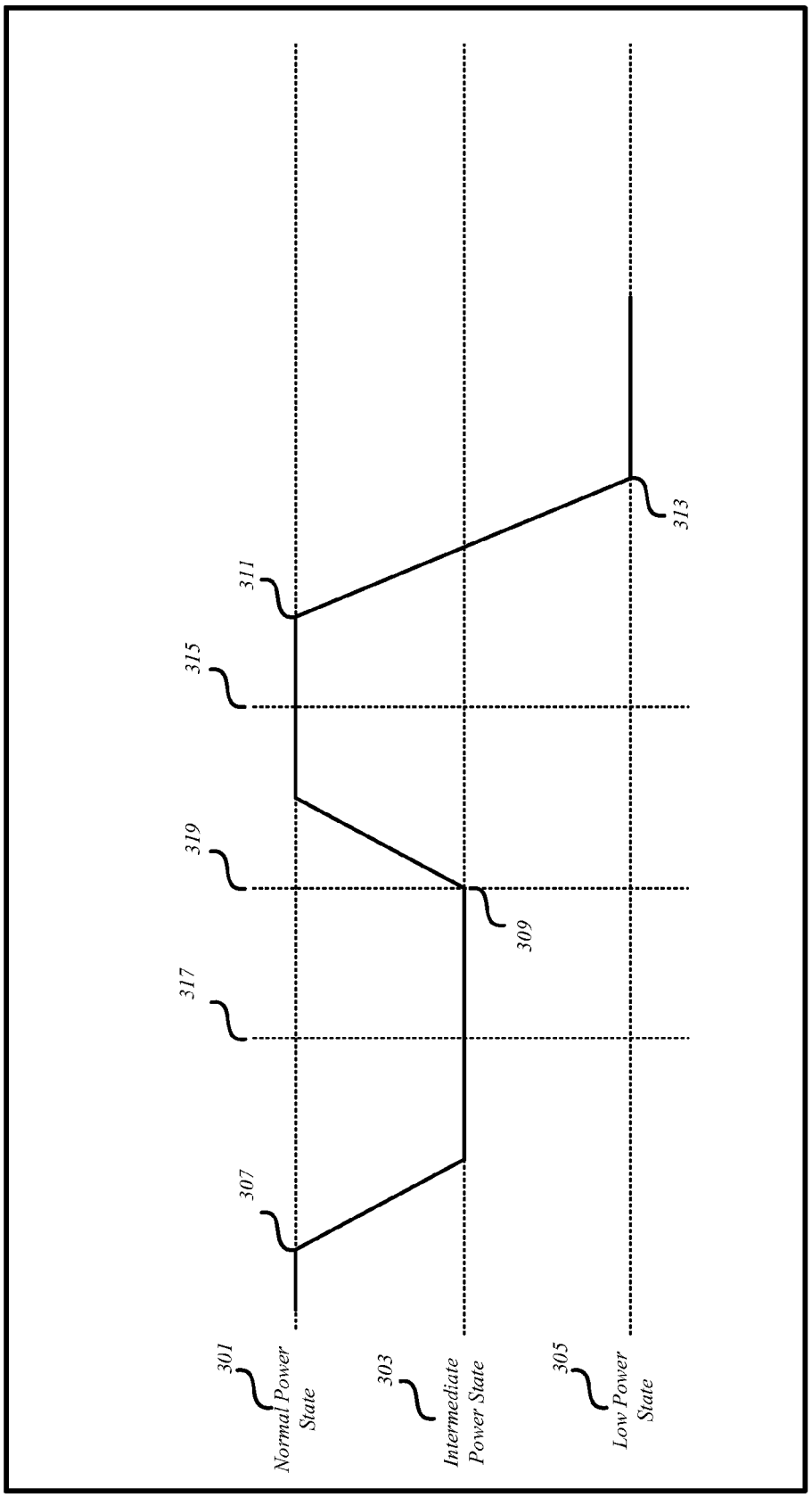
FIG. 3B illustrates an embodiment of a second activity level diagram.

FIG. 3B/3C illustrate an embodiment of a second activity level diagram 325 and third activity level diagram 350 for transitioning to a low power state. In these embodiments, the platform processing device 110 and components may exit the immediate power state 303 prior to the defined event 315 to process software processes for transitioning into the low power state. For example, the processing component may be interrupted or awaken from the intermediate power state 303 to process one or more of an autonomous hardware process or software process holding up the transition into the lower power state. At point 307, the platform processing device 110 may receive an indication that the platform processing device 110 may enter a low power state and the transition to the low power state 305 may be initiated. The platform processing device 110 may enter an intermediate power state 303, as previously discussed, until the expiration of the longer of a platform specific time period or software ready time period occurs.

In some embodiments, the platform processing device 110 and power management component 115 may exit the intermediate power state 303 prior to the defined event indicated by line 315. Lines 317 and 319 illustrate when the expiration of the platform specific time period and software ready time period expire, respectively. In FIG. 3B, the software ready time period expires after the platform specific time period and the power management component 115 may wait until the software ready time period expires to initiate a transition back into the normal power state 303, at point 309. However, as illustrated in FIG. 3C, the platform specific time period may occur after the software ready time as indicated by line 317. In this example, the power management component 115 may wait until the expiration of the platform specific time period before transition back into the normal power state 301 to process software processes.

The platform processing device 110 may enter the normal power state 301 and process any software processes required to complete to transition into the low power state 305. The platform processing device 110 and cores may complete processing these software processes at point 311 and another transition into the low power state 311 may be initiated by the platform processing device 110 or by the operating system by entering the platform processing device 110 into the intermediate power state 303. In some embodiments, all of the hardware autonomous processing and software processing may be complete and the platform processing device 110 may be permitted to enter the low power state at point 313.

Figure 3D:
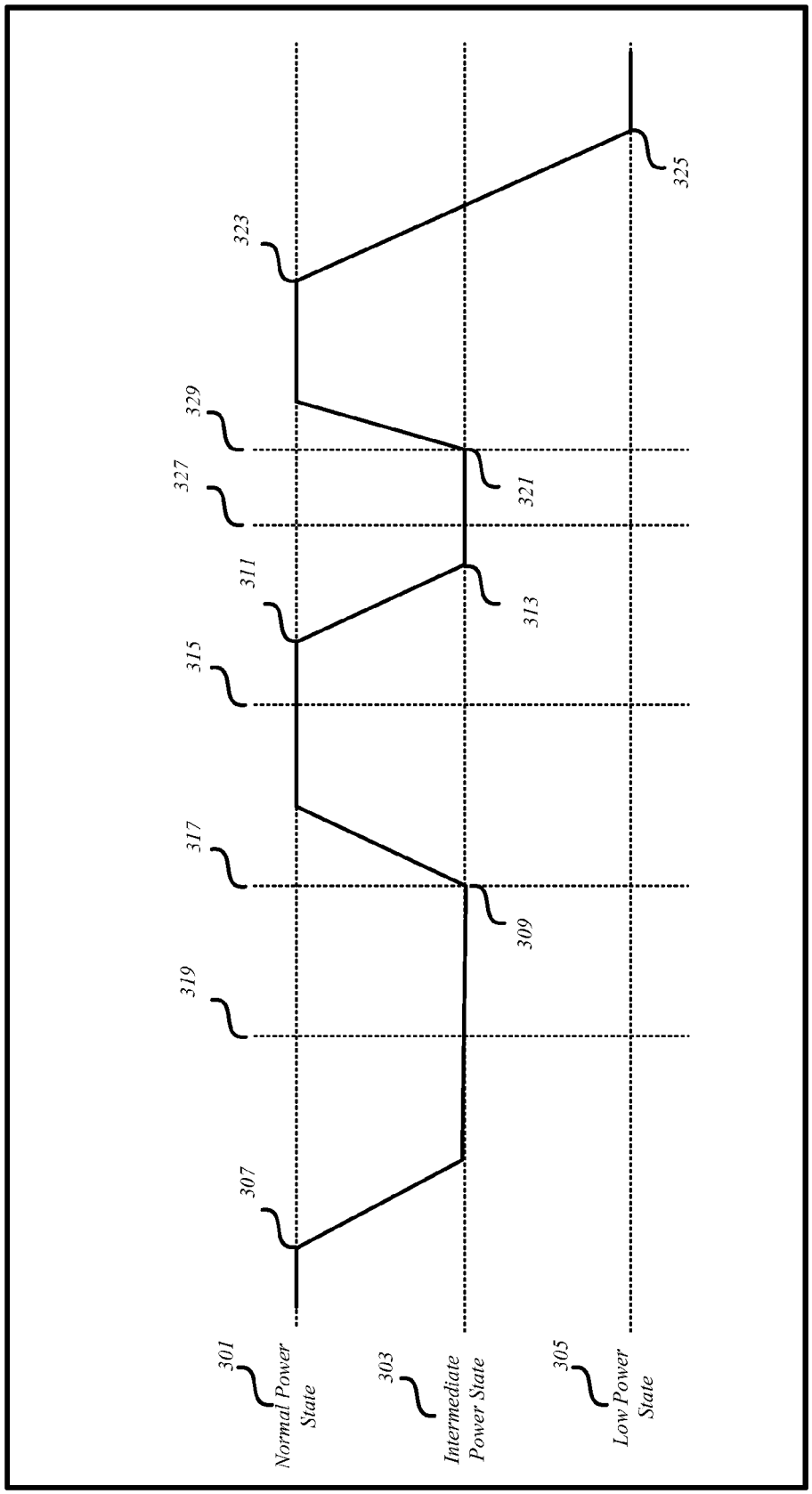
FIG. 3D illustrates an embodiment of a fourth activity level diagram.

FIG. 3D illustrates an embodiment of a fourth activity level diagram 375 for transitioning a platform processing device into a low power state. The fourth activity level diagram 375 is similar to activity level diagram 350 and transitions back into a normal power state 301 at the expiration of a platform specific time period indicated by line 317. However in this embodiment, not all of the hardware autonomous processes and software processes have completed at point 311 when the platform processing device 110 receives an indication to enter into the low power state. For example, some hardware autonomous processes and/or software processes may be dependent on the completion of other software processes. The platform processing device 110 and components may go back into the intermediate power state 303 and wait the longer of the platform specific time period and software ready time period before exiting the intermediate power state 303 and processing additional software processes.

In one example, the software ready time period may occur after the platform specific time period as indicated by line 329 occurring after line 327. The platform processing device 110 may then transition back into the normal processing state 301 at point 321 to process additional software processes. The platform processing device 110 may finish processing these software processes and receive an indication to enter into a low power state 303 at point 323. The platform processing device 325 may then enter the low power state at point 325. Various embodiments are not limited to the above-recited example, in some embodiments the platform specific time period may expire after the software ready time period.

In addition, as previously discussed with respect to the FIG. 2, upon expiration of the longer of the platform specific time period and the software ready time period, the power management component 115 may determine if all of the autonomous processes and software processes are complete, and if so, may transition the platform processing device 110 into the low power state 305. More specifically, the platform processing device 110 and components will not go back into the normal power state 301, but will transition to the low power state 305.

Figure 4:
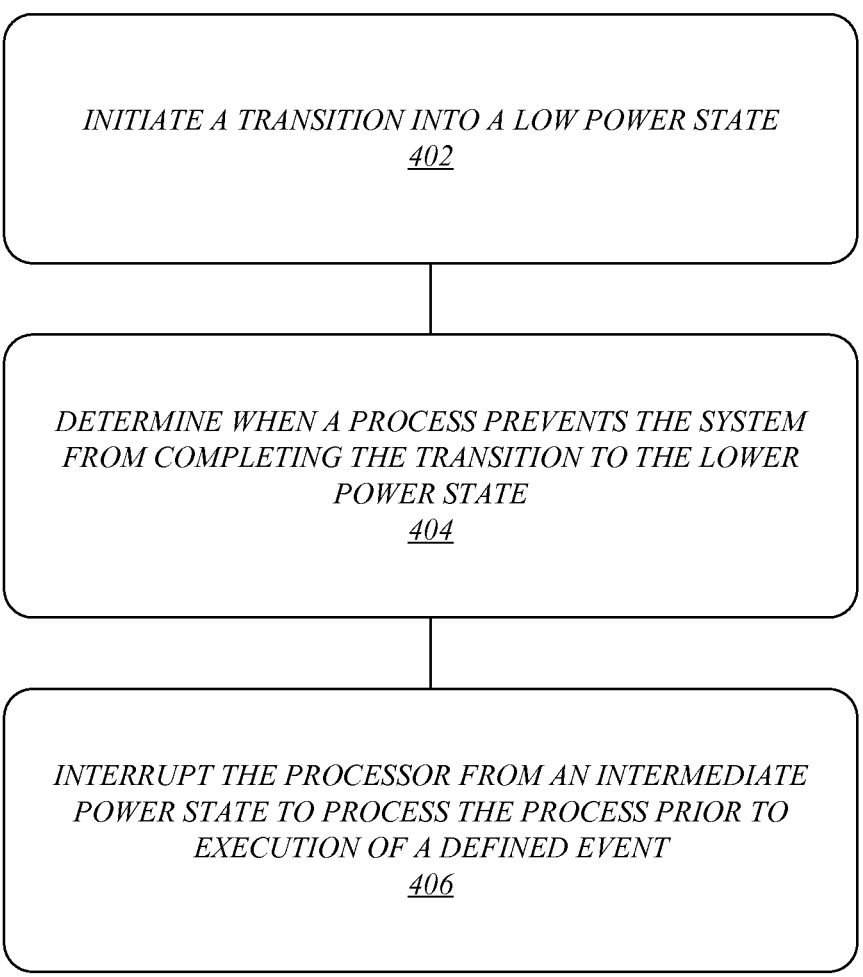
FIG. 4 illustrates an embodiment of a second logic flow.

FIG. 4 illustrates one embodiment of a second logic flow 400. The logic flow 400 may be representative of some or all of the operations executed by one or more embodiments described herein. For example, the logic flow 400 may illustrate operations performed by the system 100 and, more particularly, computer system 105 of system 100. In the illustrated embodiment shown in FIG. 4, the logic flow 400 may include initiating a transition into a low power state at block 402. More specifically, a power management component 115 may receive an indication from software, such as an operating system, to put a platform processing device 110 into a low power state. In one example, the indication may be information including an instruction to put the platform processing device into an intermediate power state such as Mwait C state corresponding to the ACPI C3 state. The power management component may then initiate the transition into the low power state by putting the platform processing device 110 into the intermediate power state.

At block 404, logic flow 400 may include determining when a process prevents the system from completing the transition to the lower power state. In various embodiments, the process may be an autonomous hardware process or a software process and the process prevents the platform processing device 110 from entering low power state because the process has failed to complete processing. In some embodiments, more than one process may be preventing the platform processing device 110 from entering the low power state.

The logic flow 400 may also include interrupting the processor from an intermediate power state to process the process prior to execution of a defined event. In particular, the power management component 115 of the platform processing device 110 may wait the longer of a platform specific time period or a software ready time period and then interrupt a processor such as processor components 112 to process or compute the process (or processes) preventing the platform processing device 110 from entering the low power state. In some embodiments, the platform processing device 110 may enter the low power without processing one or more processes because the hardware autonomous processes and were able to complete before the expiration of the platform specific time period.

Figure 5:
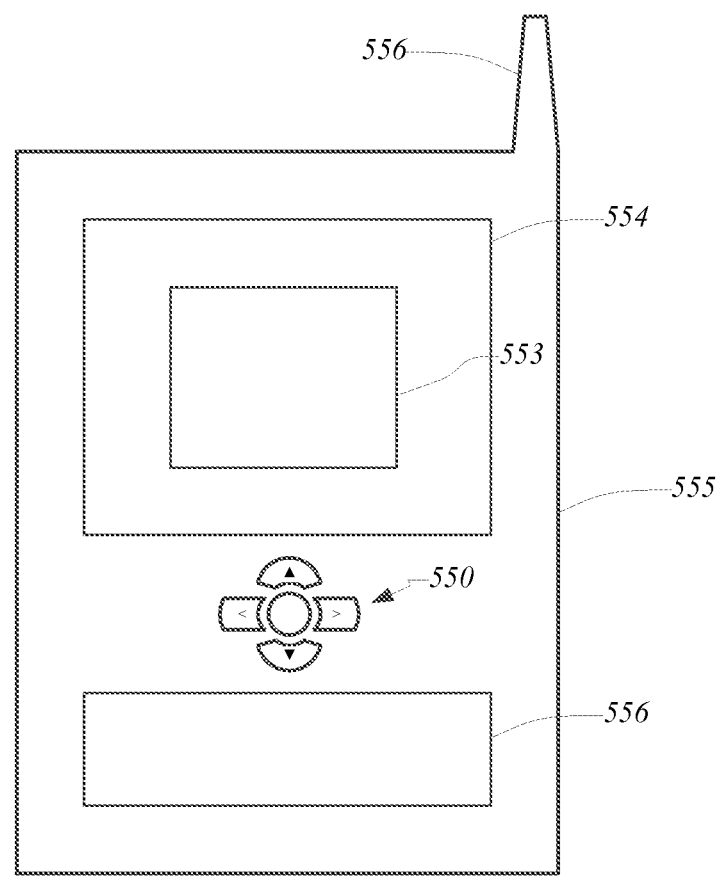
FIG. 5 illustrates an embodiment of a computing device.

FIG. 5 illustrates embodiments of a computing device 500 in which system 100 may be embodied. In embodiments, for example, device 500 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 5, device 500 may include a display 554, a navigation controller 550, a user interface 553, a housing 555, an I/O device 556, and an antenna 557. Display 554 may include any suitable display unit for displaying information appropriate for a mobile computing device. Navigation controller 550 may include one or more navigation features which may be used to interact with user interface 553. I/O device 556 may include any suitable I/O device for entering information into a mobile computing device. Examples for I/O device 556 may include an alphanumeric keyboard, a numeric keypad, a touch pad, input keys, buttons, switches, rocker switches, microphones, speakers, voice recognition device and software, and so forth. Information also may be entered into device 500 by way of microphone. Such information may be digitized by a voice recognition device. The embodiments are not limited in this context.

Figure 6:
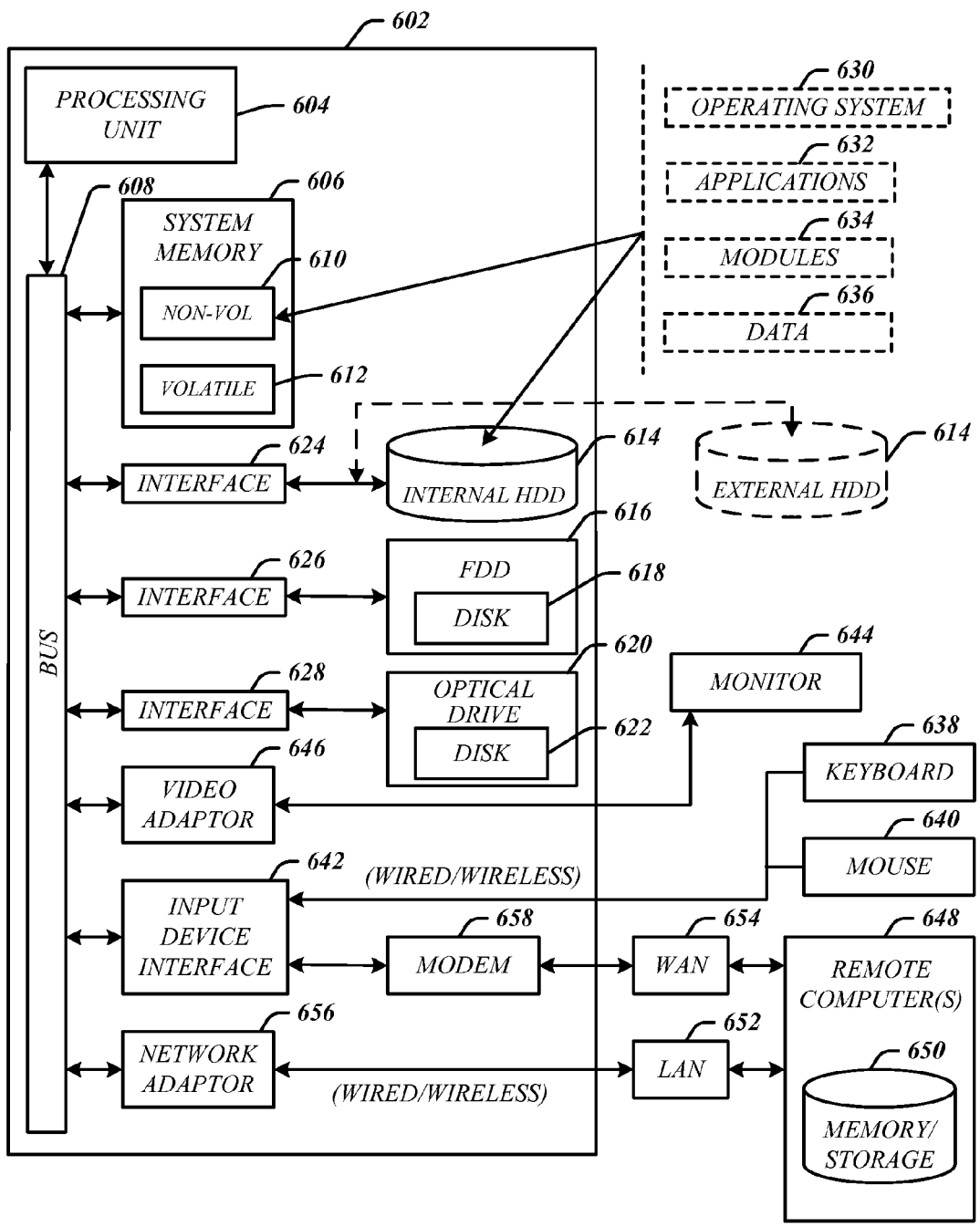
FIG. 6 illustrates an embodiment of a computing architecture.

FIG. 6 illustrates an embodiment of an exemplary computing architecture 600 suitable for implementing various embodiments as previously described. In one embodiment, the computing architecture 600 may comprise or be implemented as part of or computing device 115.

As used in this application, the terms "system" and "component" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors, such as those described with reference to the platform processing device 110 shown in FIG. 1.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 600 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and/or components of the system 105.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.11 over-the-air modulation techniques). This includes at least WiFi (or Wireless Fidelity), WiMax, and Bluetooth™ wireless technologies, 3G, 4G, LTE wireless technologies, among others. Thus, the communication can be a predefined structure as with a conventional network or simply an ad hoc communication between at least two devices. WiFi networks use radio technologies called IEEE 802.11x (a, b, g, n, etc.) to provide secure, reliable, fast wireless connectivity. A WiFi network can be used to connect computers to each other, to the Internet, and to wire networks (which use IEEE 802.3-related media and functions).

The various elements of the computer system 105 as previously described with reference to FIGS. 1-6 may comprise various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through thirty-one (1-31) provided below are intended to be exemplary and non-limiting.

In a first example, an apparatus or computing device include may a platform processing device comprising a processor component and a power management component, the power management component to initiate a transition into a lower power state and determine that a device process prevents the platform processing device from completing the transition to the lower power state, the power management component to interrupt the processor component from an intermediate power state in order to compute or execute the process prior to execution of a defined event.

In a second example and in furtherance of the first example, the device process to comprise a software process or an autonomous hardware process, and the power management component to determine when the software process or autonomous hardware process prevents the platform processing device from transitioning into the low power state.

In a third example and in furtherance of any of the previous examples, the apparatus or computing device may include the power management component to wait a platform specific timer period before interrupting the processor component.

In a fourth example and in furtherance of any of the previous examples, the apparatus or computing device may include the power management component to determine which of a platform specific time period or a software ready time period is longer and to wait the longer of the platform specific time period or the software ready time period before interrupting the processor component.

In a fifth example and in furtherance of any of the previous examples, the defined event comprising a defined interrupt or an expiration of a timer, the defined event to occur after the expiration of the platform specific time period and the software ready time period.

In a sixth example and in furtherance of any of the previous examples, the software ready time period to indicate when a software process can process a task and the platform specific time period to indicate when autonomous hardware processes are complete.

In a seventh example and in furtherance of any of the previous examples, an apparatus or computing device may include the power management component to wait for one or more autonomous hardware processes to complete and to transition the platform processing device to the lower power state when the one or more autonomous hardware processes are complete.

In an eighth example and in furtherance of any of the previous examples, the apparatus or computing device may include the processor component to execute the process that prevents the apparatus from entering the lower power state, and notify the platform processing device to enter into the lower power state upon completion of execution.

In a ninth example and in furtherance of any of the previous examples, the apparatus or computing device may include the power management component to determine when the process prevents entry into the lower power state when the platform processing device does not enter the low power state upon expiration of a platform specific time period or completion of processing of one or more autonomous hardware processes.

In a tenth example and in furtherance of any of the previous examples, an apparatus or computing device may include a memory, a graphics processing unit, and an input/output (I/O) device.

In a eleventh example and in furtherance of any of the previous examples, An article comprising a computer-readable storage medium containing a plurality of instructions that when executed enable a processor to initiate a transition into a lower power state, determine that a device process prevents the system from completing the transition to the lower power state and interrupt the processor from an intermediate power state in order to process the process prior to execution of a defined event.

In an twelfth example and in furtherance of any of the previous examples, the device process to comprise a software process or an autonomous hardware process and the plurality of instructions that when executed by the processor enable the system to determine when the software process or autonomous hardware process prevents the system from transitioning into the low power state.

In a thirteenth example and in furtherance of any of the previous examples, an article may include a computer-readable storage medium containing a plurality of instructions that when executed enable a processor to wait a platform specific timer period before interrupting the processor component.

In a fourteenth example and in furtherance of any of the previous examples, an article may include a computer-readable storage medium containing a plurality of instructions that when executed enable a processor to determine which of a platform specific time period or a software ready time period is longer and wait the longer of the platform specific time period or the software ready time period before interrupting the processing component.

In a fifteenth example and in furtherance of any of the previous examples, the software ready time period to indicate when the software process can process a task and the platform specific time period to indicate when autonomous hardware processes are complete.

In a sixteenth example and in furtherance of any of the previous examples, the defined event comprises defined interrupt or expiration of a timer, the defined event to occur after the expiration of the platform specific time period and the software ready time period.

In a seventeenth example and in furtherance of any of the previous examples, an article may include a computer-readable storage medium containing a plurality of instructions that when executed enable a processor to wait for one or more autonomous hardware processes to complete and transition the platform processing device to the lower power state when the one or more autonomous hardware processes are complete.

In an eighteenth example and in furtherance of any of the previous examples, an article may include a computer-readable storage medium containing a plurality of instructions that when executed enable a processor execute the process preventing the system from entering the lower power state and enter the lower power state upon completion of the process.

In a nineteenth example and in furtherance of any of the previous examples, an article may include a computer-readable storage medium containing a plurality of instructions that when executed enable a processor to determine when the process prevents entry into the lower power state and when the system does not enter the low power state upon expiration of a platform specific time period or completion of processing of one or more autonomous hardware processes.

In a twentieth example and in furtherance of any of the previous examples, a method may include initiating a transition into a lower power state, determining that a device process prevents a platform processing device from completing the transition to the lower power state and interrupting a processing component from an intermediate power state in order to process the process prior to execution of a defined event.

In a twenty-first example and in furtherance of any of the previous examples, a method may include determining when the software process or autonomous hardware process prevents the platform processing device from transitioning into the low power state.

In a twenty-second example and in furtherance of any of the previous examples, a method may include determining which of a platform specific time period or a software ready time period is longer and waiting the longer of the platform specific time period or the software ready time period before interrupting the processing component.

In a twenty-third example and in furtherance of any of the previous examples, a method may include waiting for one or more autonomous hardware processes to complete and transitioning the platform processing device to the low power state when the one or more autonomous hardware processes are complete.

In a twenty-fourth example and in furtherance of any of the previous examples, a method may include executing the process preventing the system from entering the lower power state and entering the lower power state upon completion of the process.

In a twenty-fifth example and in furtherance of any of the previous examples, a method may include determining when the process prevents entry into the lower power state and when the system does not enter the low power state upon expiration of a platform specific time period or completion of processing of one or more autonomous hardware processes.

In a twenty-six example and in furtherance of any of the previous examples, a controller may include comprising logic at least a portion of which is in hardware, the logic to initiate a transition into the lower power state and determine that a device process prevents the platform processing device from completing the transition to the lower power state, and interrupt the processor component from an intermediate power state in order to compute the process prior to execution of a defined event.

In a twenty-seventh example and in furtherance of any of the previous examples, a controller may include comprising logic at least a portion of which is in hardware, the logic to wait a platform specific timer period before interrupting the processor component.

In a twenty-eighth example and in furtherance of any of the previous examples, a controller may include comprising logic at least a portion of which is in hardware, the logic to determine which of a platform specific time period or a software ready time period is longer and the logic to wait the longer of the platform specific time period or the software ready time period before interrupting the processor component.

In a twenty-ninth example and in furtherance of any of the previous examples, a controller may include comprising logic at least a portion of which is in hardware, the logic to wait for one or more autonomous hardware processes to complete and to transition the platform processing device to the lower power state when the one or more autonomous hardware processes are complete.

In a thirtieth example and in furtherance of any of the previous examples, a controller may include comprising logic at least a portion of which is in hardware, the logic to execute the process that prevents the apparatus from entering the lower power state, and to notify the platform processing device to enter into the lower power state upon completion of execution.

In a thirty-first example and in furtherance of any of the previous examples, a controller may include comprising logic at least a portion of which is in hardware, the logic to determine when the process prevents entry into the lower power state when the platform processing device does not enter the low power state upon expiration of a platform specific time period or completion of processing of one or more autonomous hardware processes.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
 a platform processing device comprising a processor component and a power management component, the power management component to:
 initiate a transition into a lower power state;
 determine whether a platform specific time period has expired or whether processing of one or more autonomous hardware processes has completed;
 determine that a device process prevents the platform processing device from completing the transition to the lower power state based on a determination that the platform specific time period has expired or that processing of the one or more autonomous hardware processes has completed; and
 interrupt the processor component from an intermediate power state in order to process the device process prior to execution of a defined event based on a determination that the device process prevents the platform processing device from completing the transition to the lower power state.

2. The apparatus of claim 1, the device process to comprise a software process or an autonomous hardware process, and the power management component to determine when the software process or autonomous hardware process prevents the platform processing device from transitioning into the low power state.

3. The apparatus of claim 1, the power management component to wait a platform specific timer period before interrupting the processor component.

4. The apparatus of claim 1, the power management component to determine which of a platform specific time period or a software ready time period is longer and to wait the longer of the platform specific time period or the software ready time period before interrupting the processor component.

5. The apparatus of claim 4, the defined event comprising a defined interrupt or an expiration of a timer, the defined event to occur after the expiration of the platform specific time period and the software ready time period.

6. The apparatus of claim 4, the software ready time period to indicate when a software process can process a task and the platform specific time period to indicate when autonomous hardware processes are complete.

7. The apparatus of claim 1, the power management component to wait for one or more autonomous hardware processes to complete and to transition the platform processing device to the lower power state when the one or more autonomous hardware processes are complete.

8. The apparatus of claim 1, the processor component to execute the process that prevents the apparatus from entering the lower power state, and notify the platform processing device to enter into the lower power state upon completion of execution.

9. An article comprising a computer-readable storage medium containing a plurality of instructions that when executed enable a processor to:
initiate a transition into a lower power state;
determine whether a platform specific time period has expired or whether processing of one or more autonomous hardware processes has completed;
determine that a device process prevents a system from completing the transition to the lower power state based on a determination that the platform specific time period has expired or that processing of the one or more autonomous hardware processes has completed; and
interrupt the processor from an intermediate power state in order to process the device process prior to execution of a defined event based on a determination that the device process prevents the platform processing device from completing the transition to the lower power state.

10. The article of claim 9, the device process to comprise a software process or an autonomous hardware process and the plurality of instructions that when executed by the processor enable the system to determine when the software process or autonomous hardware process prevents the system from transitioning into the low power state.

11. The article of claim 9, comprising the computer-readable storage medium containing the plurality of instructions that when executed enable the processor to wait a platform specific timer period before interrupting the processor.

12. The article of claim 9, comprising the computer-readable storage medium containing the plurality of instructions that when executed enable the processor to:
determine which of a platform specific time period or a software ready time period is longer; and
wait the longer of the platform specific time period or the software ready time period before interrupting the processor.

13. The article of claim 9, comprising the computer-readable storage medium containing the plurality of instructions that when executed enable the processor to:
wait for one or more autonomous hardware processes to complete; and
transition the system to the lower power state when the one or more autonomous hardware processes are complete.

14. The article of claim 9, comprising the computer-readable storage medium containing the plurality of instructions that when executed enable the processor to:
execute the process preventing the system from entering the lower power state; and
enter the lower power state upon completion of the process.

15. A controller, comprising logic at least a portion of which is in hardware, the logic to:
initiate a transition into a lower power state;
determine whether a platform specific time period has expired or whether processing of one or more autonomous hardware processes has completed;
determine that a device process prevents a platform processing device from completing the transition to the lower power state based on a determination that the platform specific time period has expired or that processing of the one or more autonomous hardware processes has completed; and
interrupt a processor component from an intermediate power state in order to process the device process prior to execution of a defined event based on a determination that the device process prevents the platform processing device from completing the transition to the lower power state.

16. The controller of claim 15, the device process to comprise a software process or an autonomous hardware process, and the logic to determine when the software process or autonomous hardware process prevents the platform processing device from transitioning into the low power state.

17. The controller of claim 15, the logic to wait a platform specific timer period before interrupting the processor component.

18. The controller of claim 15, the logic to determine which of a platform specific time period or a software ready time period is longer and the logic to wait the longer of the platform specific time period or the software ready time period before interrupting the processor component.

19. The controller claim 18, the defined event comprising a defined interrupt or an expiration of a timer, the defined event to occur after the expiration of the platform specific time period and the software ready time period.

20. The controller of claim 19, the software ready time period to indicate when a software process can process a task and the platform specific time period to indicate when autonomous hardware processes are complete.

21. The controller of claim 15, the logic to wait for one or more autonomous hardware processes to complete and to transition the platform processing device to the lower power state when the one or more autonomous hardware processes are complete.

22. The controller of claim 15, the logic to execute the process that prevents entering the lower power state, and to notify the platform processing device to enter into the lower power state upon completion of execution.

\* \* \* \* \*